United States Patent [19]

Inoue

[11] Patent Number: 4,987,504
[45] Date of Patent: Jan. 22, 1991

[54] DRIVE AND WINDING REEL ARRANGEMENT IN A MAGNETIC RECORDING AND REPRODUCING DEVICE

[75] Inventor: Yoshihisa Inoue, Hannou, Japan

[73] Assignee: Nakamichi Corporation, Kodaira, Japan

[21] Appl. No.: 303,266

[22] Filed: Jan. 26, 1989

[30] Foreign Application Priority Data

Jan. 27, 1988 [JP] Japan ................... 63-16589

[51] Int. Cl.⁵ .......................................... G11B 15/67
[52] U.S. Cl. ................................................ 360/95
[58] Field of Search ......................... 360/95; 242/195

[56] References Cited

U.S. PATENT DOCUMENTS 4,739,569 12/1988 Ohsaki .................................. 242/195
4,787,570 11/1988 Nakagome ............................. 360/95

Primary Examiner—Robert S. Tupper
Attorney, Agent, or Firm—Pearne, Gordon, McCoy & Granger

[57] ABSTRACT

A magnetic recording and reproducing apparatus for use with a tape cartridge including a single tape reel having a compact drive and winding reel arrangement.

3 Claims, 11 Drawing Sheets

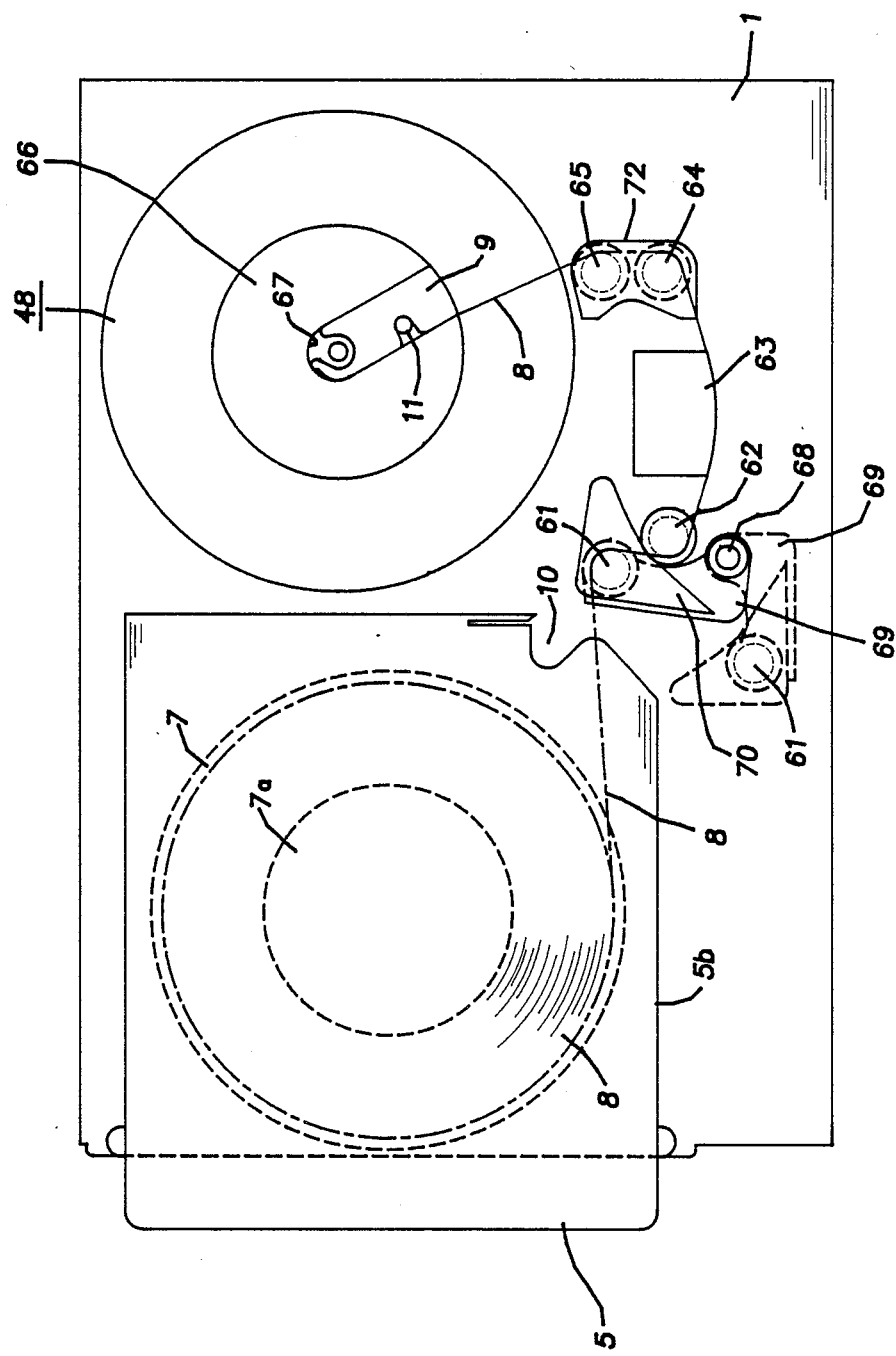

DRIVE AND WINDING REEL ARRANGEMENT IN A MAGNETIC RECORDING AND REPRODUCING DEVICE

BACKGROUND OF THE INVENTION

One magnetic recording and reproducing apparatus used for backing up information as a computer peripheral equipment is of type of guiding and driving a magnetic tape on a single tape reel in a tape cartridge commonly called "IBM 3480" magnetic tape cartridge to a winding reel disposed in the magnetic recording and reproducing apparatus along a predetermined tape running path, as disclosed in Japanese Patent Application Laying-Open Gazzette No. 171,773/1983, for example. In such an apparatus, the magnetic tape contained in the tape cartridge has a leader block provided at its leading end while the magnetic recording and reproducing apparatus has leader block guide and drive means to draw out the leader block to the winding reel. Such an apparatus is disclosed in Japanese Patent Application Publication No. 42,539/1985, for example.

Present computers are so designed as to be physically provided with 5¼ inch Winchester disk drive or 5¼ inch floppy disk drive. These drives are so constructed as to meet the industrial standard in which they have a width of 5¾ inch, a height of 3¼ inch and a length of 8 inch. Such a size is called 5¼ inch form factor in the computer industry.

On designing the magnetic recording and reproducing apparatus, such components as the winding reel, a magnetic head, guide rollers and the leader block guide and drive means are required to have a reasonable layout in order to compact the magnetic recording and reproducing apparatus while it meets the aforementioned form factor. However, the prior magnetic recording and reproducing apparatus has failed to have the appropriate layout, which inhibits its compactness.

SUMMARY OF THE INVENTION

Accordingly, it is a principal object of the invention to provide a magnetic recording and reproducing apparatus adapted to dispose a tape cartridge, a winding reel, a magnetic head and at least an electric motor for leader block guide and drive means in the most appropriate layout whereby the apparatus can be compacted.

It is another object of the invention to provide a magnetic recording and reproducing apparatus adapted to meet the 5¼ inch form factor of the industrial standard.

In accordance with the present invention, there is provided a magnetic recording and reproducing apparatus comprising leader block guide and drive means to guide and drive a leader block provided at a leading end of a magnetic tape on a single tape reel in a tape cartridge from said tape cartridge to a winding reel having a recess provided therein to mount said leader block on said winding reel so that said magnetic tape is guided along a tape running path including a magnetic head, characterized by;

said leader block guide and drive means comprising at least an electric motor and a drawing pin member driven by said electric motor through a transmission mechanism and engageable with said leader block;

said tape cartridge at its front side begining to be inserted into said magnetic recording and reproducing apparatus;

when said tape cartridge is brought to a cartridge operative position, said single tape reel being disposed so that the rotational axis of said single tape reel is positioned on one side of a first line which divides a length of said magnetic recording and reproducing apparatus into two halves and on one side of a second line which divides a width of said magnetic recording and reproducing apparatus into two halves, said leader block being disposed on the other side of said second line and said tape cartridge being disposed so that a side face of said tape cartridge is positioned in parallel to a longitudinal direction of said magnetic recording and reproducing apparatus;

said winding reel being disposed so that a rotational axis of said winding reel is positioned on the other side of said first line and on the one side of said second line;

said magnetic head being disposed on the other side of said first line and on the other side of said second line;

at least said electric motor for said leader block guide and drive means being disposed on the one side of said first line and on the other side of said second line;

and a distance between said second line and said rotational axis of said winding reel being set longer than a distance between said second line and said rotational axis of said single tape reel.

It will be understood that as the tape cartridge, the single tape reel, the magnetic head and the winding reel are disposed so that they have the aforementioned layout, the tape cartridge and the winding reel can be displaced offset in one side within the magnetic recording and reproducing apparatus, which allows the electric motor for the drawing pin member and the magnetic head to be disposed within a space formed by the offset of the tape cartridge and the winding reel, and that this causes the magnetic recording and reproducing apparatus to be compacted.

BRIEF DESCRIPTION OF THE DRAWINGS

The above and other objects and features of the invention will be apparent from the description of the embodiment of the invention taken along with the accompanying drawings in which;

FIG. 8 illustrates in plane view a tape running path;

DETAILED DESCRIPTION OF THE EMBODIMENT

Figure 1:
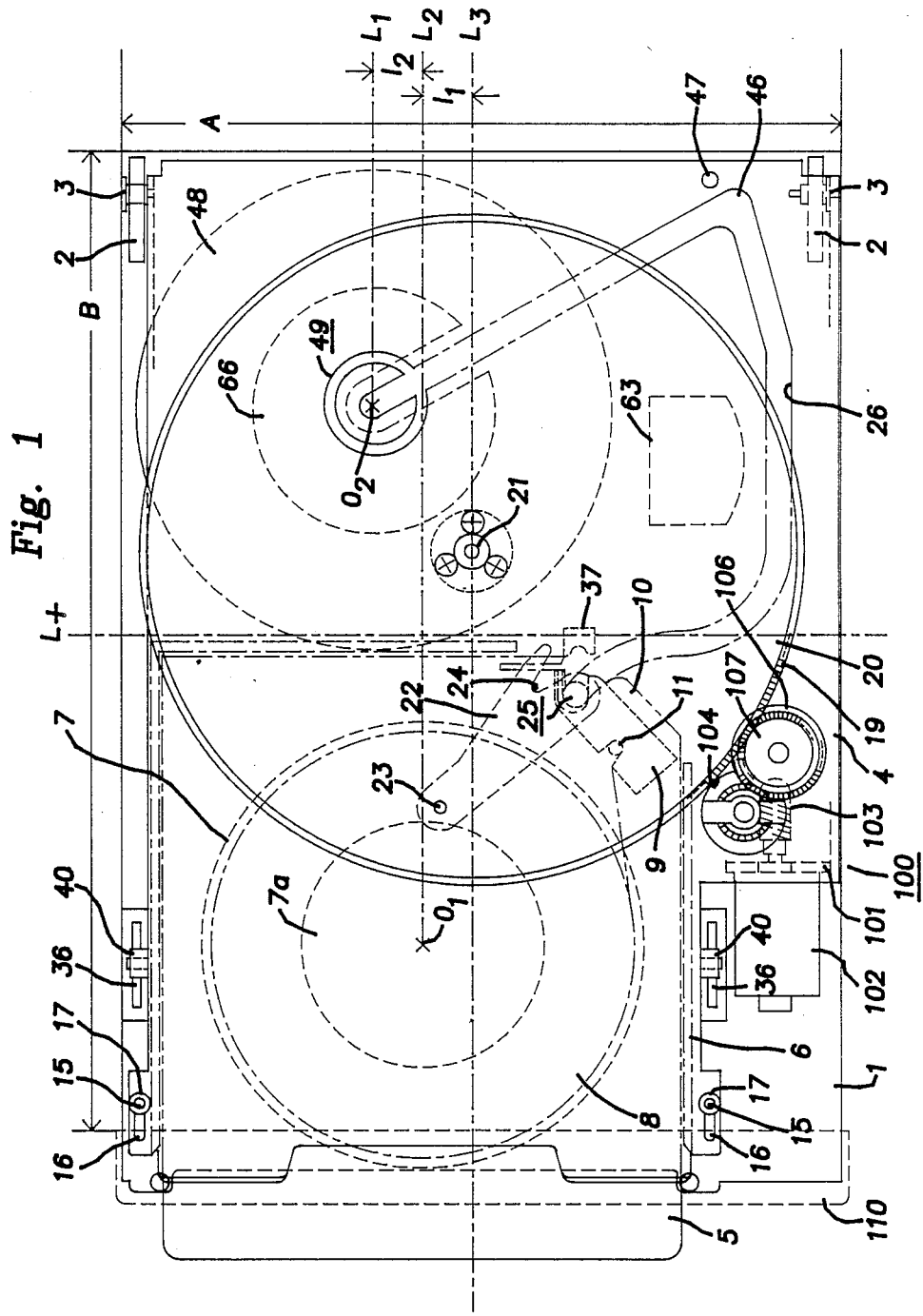
FIG. 1 is a plane view of a magnetic reecording and reproducing apparatus in the condition of locating a tape cartridge at a cartridge operative position.
Figure 2:
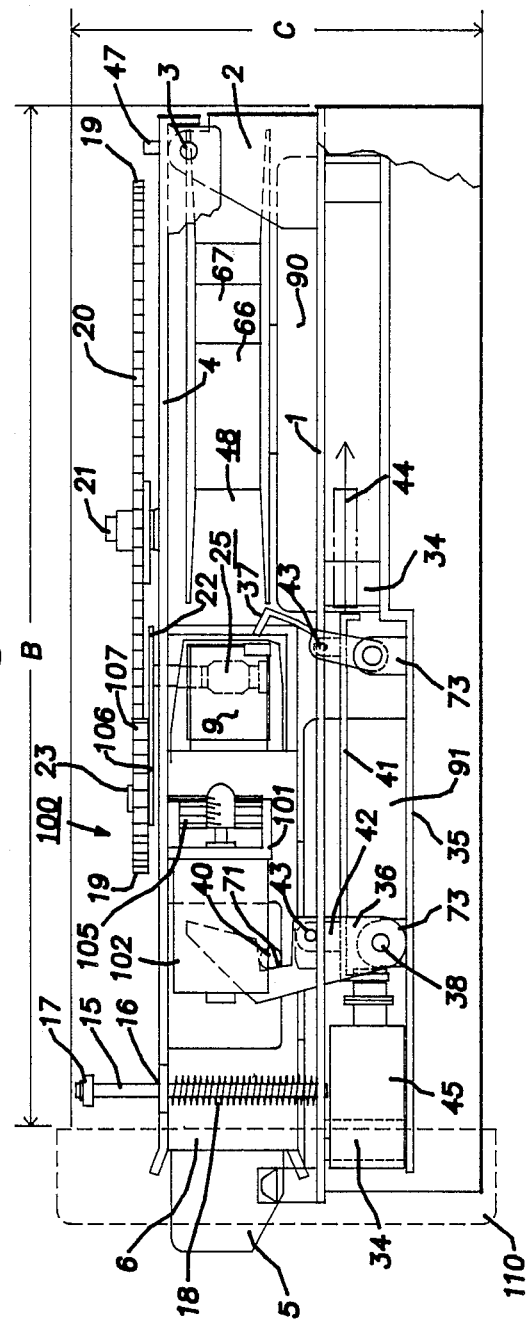
FIG. 2 is a side elevational view of the apparatus of FIG. 1 with a portion broken away.
Figure 3:
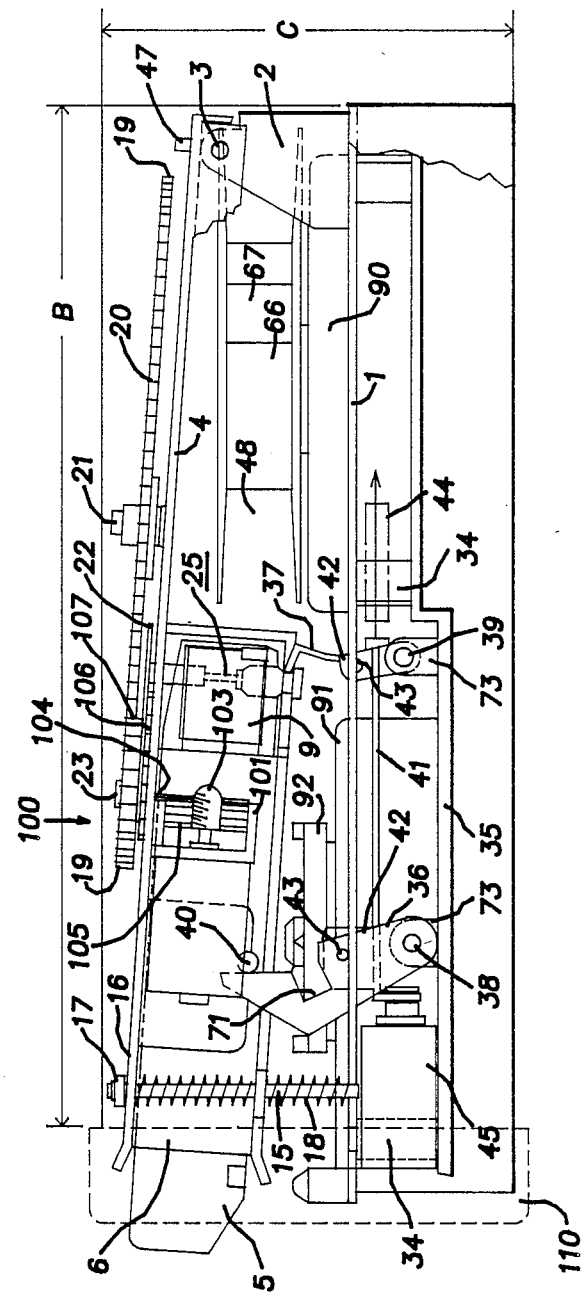
FIG. 3 is a side elevational view of the apparatus in the condition of locating the tape cartridge at a cartridge loading and unloading position.

Referring now to FIGS. 1 through 3, there is shown a magnetic recording and reproducing apparatus. Brackets 2 and 2 of a chassis 1 have a holder base plate 4 at one end thereof pivotally supported by pivotal pins 3 and 3 thereon. The holder base plate 4 has a cartridge holder 6 provided on the lower face thereof to contain a tape cartridge 5 therein.

Figure 4A:
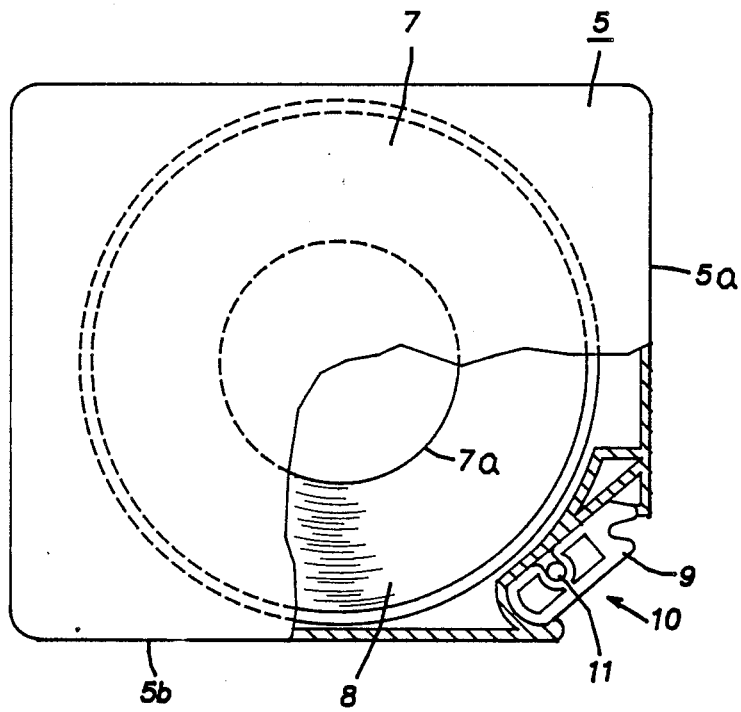
FIG. 4a is a plane view of the tape cartridge with a portion thereof broken away.
Figure 4B:
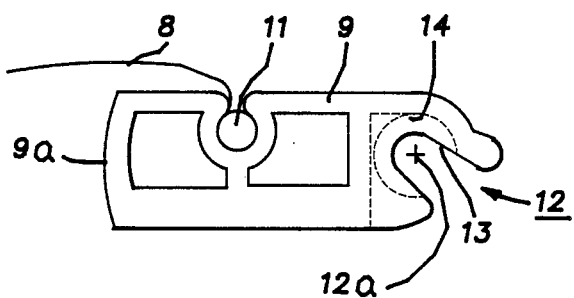
FIG. 4b is an enlarged plane view of a leader block in the tape cartridge.

As shown in FIGS. 4a and 4b, the tape cartridge 5 has a single tape reel 7 contained therein and a leader block 9 provided at a leading end of a magnetic tape 8 wound on the single tape reel 7. The leader block 9 is removably engaged in an opening 10 in the tape cartridge 5 at a corner defined by a front face 5a and one of side faces 5b. The magnetic tape 8 is connected to the leader block 9 by engaging the leading end of the magnetic tape 8 with the leader block 9 at its side recess by a cylindrical pin 11. A slot 12 formed in the end of the leader block 9 includes a slot portion 13 which is narrower in view of the width of the magnetic tape 8 and a slot portion 14 which is wider in view of the width of the magnetic tape 8, as shown in FIG. 4b. A rear end face 9a of the leader block 9 has the same curvature as a hub 7a of the single tape reel 7 has and the distance between a center 12a of the slot 12 and the rear end face 9a is equal to a radius of the hub 7a. It should be noted that the tape cartridge 5 has a width D of 4¼ inch, a length E of 4⅜ inch and a height of 15/16 inch while the single tape reel 7 has a diameter of 3¾ inch.

As shown in FIGS. 1 through 3, a pair of pins 15 and 15 are provided on the chassis 1 to control the pivotal movement of the holder base plate 4. The pair of pins 15 and 15 extend through rectangular holes 16 and 16 in the holder base plate 4 at its free end and have stops 17 and 17 secured thereto. A pair of coil springs 18 and 18 disposed around the pins 15 and 15 between the chassis 1 and the holder base plate 4 urge the holder base plate 4 away from the chassis 1.

On the holder base plate 4 at a center line $L_1$ thereof in the widthwise direction of the apparatus is journaled by a shaft 21 a spur wheel 20 having a gear 19 provided on the peripheral face thereof. The spur wheel 20 is adapted to be driven in both directions by a reduction gear drive mechanism 100 including an electric motor 102, a worm gear 103, a worm wheel 105 extending through an opening 104 in the holder base plate 4 and reduction gears 106 and 107. It will be noted that the electric motor 102 and the worm wheel 105 are mounted on a mounting plate 101 which is in turn mounted on the holder base plate 4 as shown in FIG. 2.

An arm 22 supported by a shaft 23 on a lower face of the spur wheel 20 has an engagement recess 24 provided therein at a free end thereof and is provided with drawing pin means 25 at the lower face of the arm 22.

Leader block guide and drive means to guide the leader block 9 to a winding reel 48 along a predetermined path comprises the reduction gear drive mechanism 100 and the drawing pin means 25 together with a guide groove 26 which will be described later.

Figure 5A:
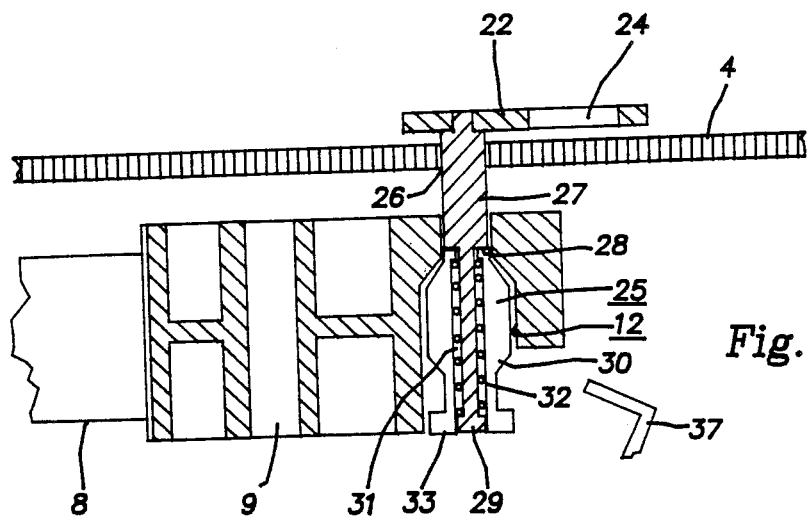
FIGS. 5a and 5b illustrate in cross sectional view the leader block and a drawing pin member having different relative positions thereof.
Figure 5B:
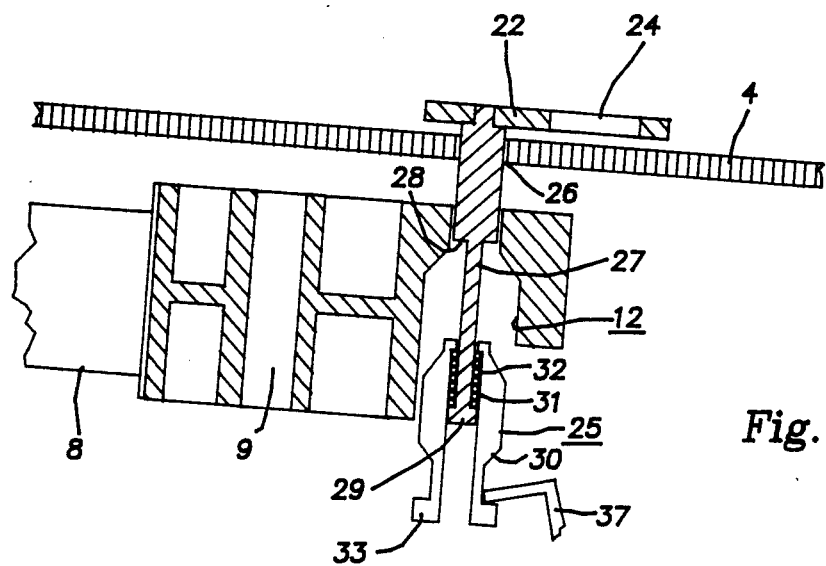

The drawing pin means 25 together with the relation of the leader block 9 is illustrated in FIGS. 5a and 5b in details.

A drawing pin member 27 is downwardly provided on the arm 22 and extends through the guide groove 26 in the holder base plate 4 and has a shoulder 28 formed thereon by thinning the drawing pin member 27 and a stop 29 provided at the lower end thereof. An engagement member 30 is slidably mounted on the drawing pin member 27 and upwardly urged by a coil spring 32 disposed around the thus drawing pin member 27 within the hollow portion 31 of the engagement member 30. The engagement member 30 has the peripheral configuration complementary of the inner configuration of the slot 12 in the leader block 9 and a flange 33 provided at the lower end thereof. As shown in FIGS. 5a and 5b, the height of the leader block 9 is so set that it is larger than the width of the magnetic tape 8.

As shown in FIGS. 1 through 3, a subsidiary chassis 35 is provided by connecting members 34 and 34 below the chassis 1. A pair of locking arms 36 and 36 having notches 71 and 71, respectively, serve to lock the holder base plate 4 when the tape cartridge 5 is brought to the cartridge operative position thereof and a control arm 37 serves to engage with the flange 33 of the engagement member 30 for the drawing pin means 25. The arms 36, 36 and 37 are pivotally mounted and supported by pivotal pins 38, 38 and 39 on brackets 73, 73, 73 and 73 of the subsidiary chassis 35, respectively. A pair of locking pins 40 and 40 are provided on the cartridge holder 6 so as to be associated with the notches 71 and 71 in the locking arms 36 and 36, respectively.

Figure 6:
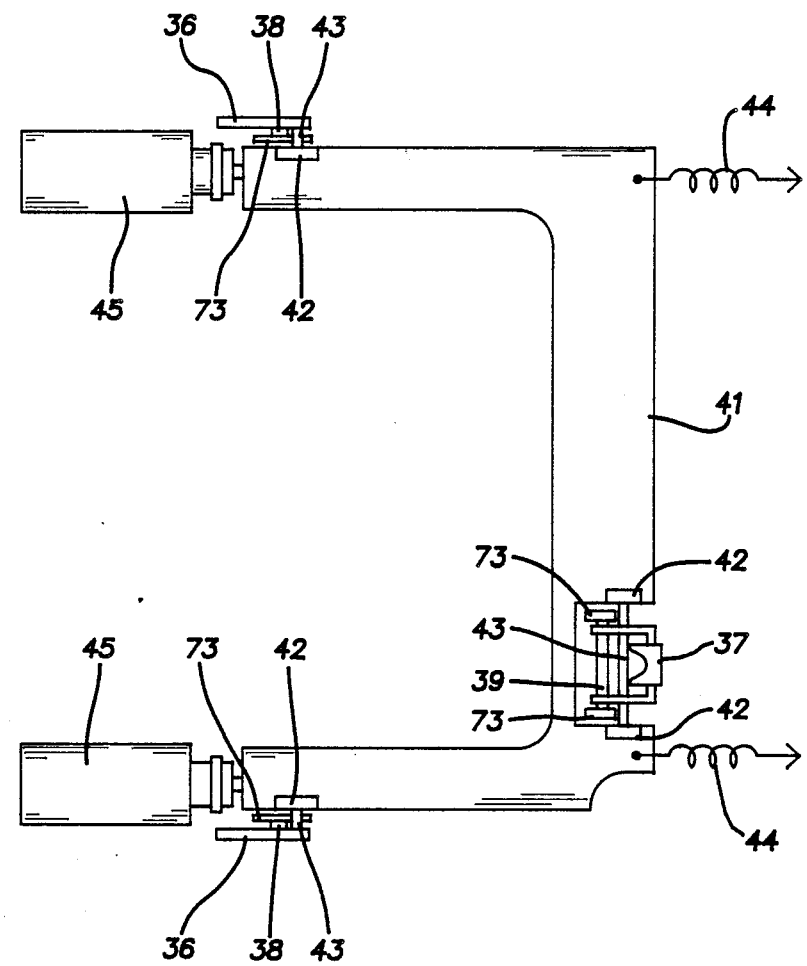
FIG. 6 illustrates in plane view locking arms and a control arm being connected to each other.

A center portion of the pair of locking arms 36 and 36 and the control arm 37 are associated with a slidable plate 41 in the form of substantially C shape as shown in FIG. 6, so as to be moved together with the slidable plate 41. Four raised ear portions 42, 42, 42 and 42 are provided on the slidable plate 41 while three connecting pins 43, 43 and 43 are provided to connect the slidable plate 41 to the locking arms 36 and 36 and the control arm 37, respectively.

A pair of coil springs 44 and 44 urge the slidable plate 41 in a rightward direction of FIG. 6 while a pair of plungers 45 and 45 serve to move the slidable plate 41 in a leftward direction against the coil springs 44 and 44 when electrically excited.

On the subsidary chassis 35 are mounted an electric motor 90 to rotationally drive a winding reel 48 and also an electric motor 91 to rotationally drive a reel support 92 to engage the single tape reel 7 in the tape cartridge 5.

Figure 7A:
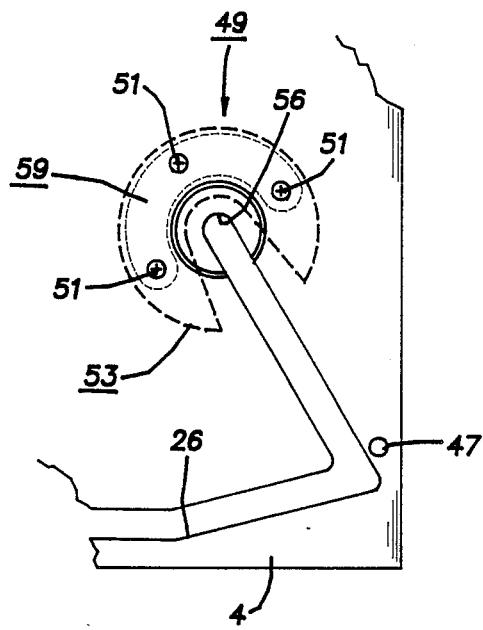
FIG. 7a illustrates in plane view positioning means for a drawing pin member and a cartridge removal arm being operated.

The whole guide groove 26 formed in the holder base plate 4 can be viewed in FIG. 1. A control pin 47 to be associated with the engagement recess 24 in the arm 22 is disposed on the holder base plate 4 near an angularly acute bent portion 46 of the guide groove 26 as shown in FIGS. 1 and 7a. It should be noted that the bent portion 46 of the guide groove 26 is positioned corresponding to the position of the drawing pin member 27 when the shaft 21 of the spur wheel 20, the shaft 23 of the arm 22 and the drawing pin member 27 are aligned with each other on a line.

Figure 11:
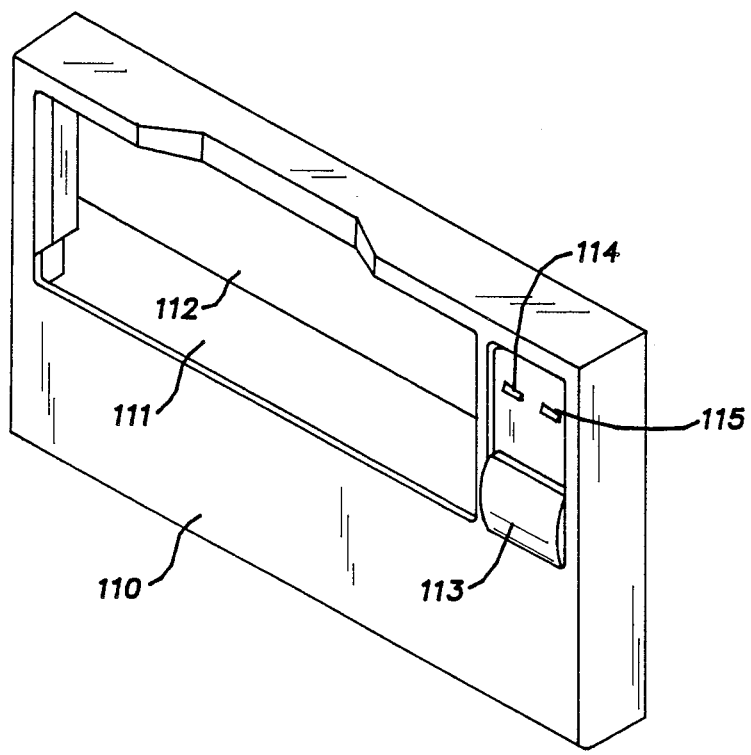
FIG. 11 is a perspective view of a front panel for the apparatus.

As indicated by a dotted line of FIGS. 1 through 3, on the front face of the apparatus may be mounted a front panel 110 having such a configuration as shown in FIG. 11. The front panel 110 is provided with an opening 111 through which the tape cartridge 5 is loaded or unloaded and a cover 112 provided at an upper edge of the opening 111 so as to cover the upper half of opening 111 to prevent dust from entering the apparatus. On the rightward side of the front panel 110 are provided a button 113 for removal of the tape cartridge 5 and indicators 114 and 115 for indicating the operative conditions of the apparatus.

The whole apparatus except for the front panel 110 has a width A of 5¾ inch, a height C of 3¼ inch and a length B of 8 inch and the portion of the apparatus corresponding to the sizes thereof is inserted into the computer. When the tape cartridge 5 is brought to the cartridge operative position shown in FIG. 1, a center $O_1$ of the single tape reel 7 is disposed on one side of and relative to a central line $L_4$ which divides the length of the apparatus into two halves while a center $O_2$ of the winding reel 48 is disposed on the other side of and relative to the central line $L_4$. In addition thereto, the centers $O_1$ and $O_2$ of the reels 7 and 48 are disposed on one side of and relative to the central line $L_1$ which divides the width of the apparatus into two halves and on which the shaft 21 of the spur wheel 20 is positioned. More particularly, the lines $L_1$ and $L_2$ are spaced by the distance $l_1$ while the lines $L_2$ and $L_3$ are spaced by the distance $l_2$ as the result of the winding reel 48 being able to be displaced at a further upper position because of no case or the like necessary as compared with the tape cartridge 5.

Accordingly, within a space provided by displacing the tape cartridge 5 and the winding reel 48 at a further upper position can be disposed the reduction gear drive mechanism 100 shown in FIG. 1, a magnetic head 63 and tape guides 61, 62, 64 and 65. The magnetic head 63 is disposed on the other side of the widthwise and longitudinal central lines $L_1$ and $L_4$ while the reduction gear drive mechanism 100 is disposed on the other side of the central line $L_1$ and on the one side of the central line $L_4$. On this condition, the leader block 9 is also positioned on the other side of the central line $L_1$ and on the one side of the central line $L_4$.

Figure 7B:
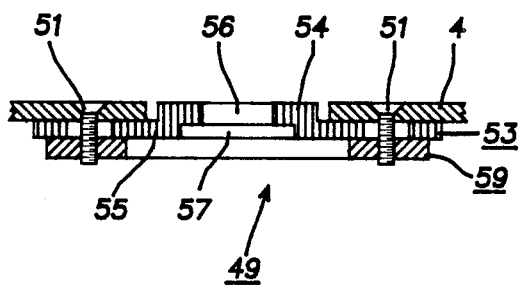
FIG. 7b illustrates the positioning means of FIG. 7a in cross sectional view.
Figure 7C:
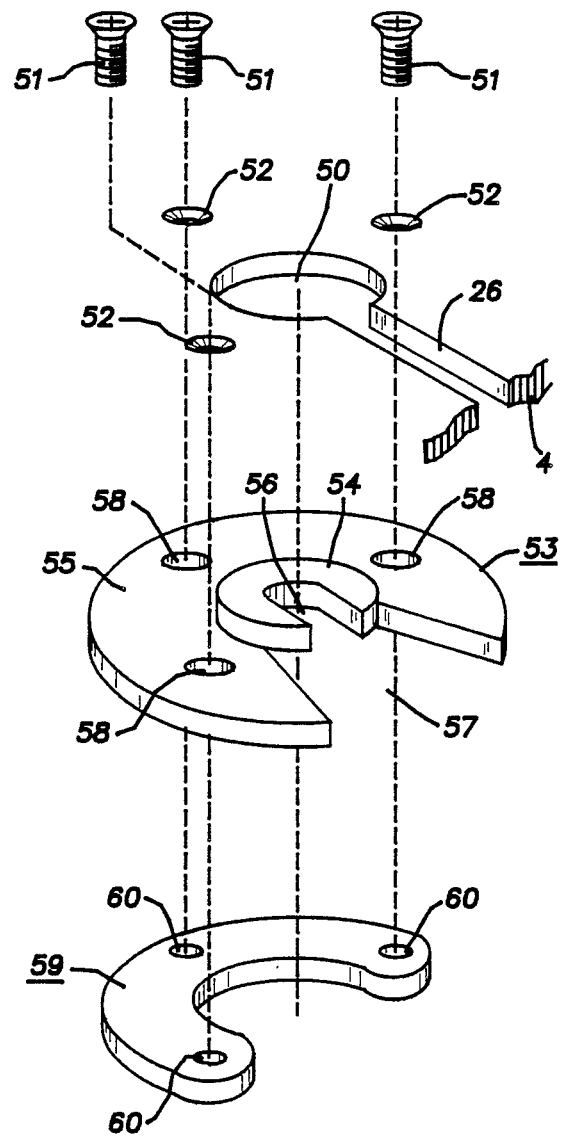
FIG. 7c illustrates the positioning means of FIG. 7a in explosive view.

FIGS. 7a through 7c show positioning means 49 provided corresponding to the end position of the guide groove 26 to align the rotational axis of the winding reel 48 with the center of the drawing pin means 25 when the leader block 9 is mounted on the winding reel 48.

A large circular hole 50 is formed in the holder base plate 4 in communication with the guide groove 26 and in alignment with the rotational axis of the winding reel 48 and three holes 52, 52 and 52 through which screws 51, 51 and 51 extend are formed in the holder base plate 4 so as to surround the large circular hole 50.

A positioning plate 53 comprises a central portion 54 which is provided with a notch 56 having the same width as the guide groove 26 and a peripheral portion 55 which is provided with a notch 57 having a width larger than that of the notch 56 and communicating with the notch 56. Three holes 58, 58 and 58 having a diameter larger than those of the screws 51, 51 and 51 are formed in the peripheral portion 55 and corresponding to the holes 52, 52 and 52 in the holder base plate 4.

An arcuate locking plate 59 is disposed on a lower face of the positioning plate 53 and has tapped holes 60, 60 and 60 formed therein to threadedly engage the screws 51, 51 and 51.

As shown in FIG. 8, a tape running path is determined by the tape guides 61 and 62, the magnetic head 63, the tape guides 64 and 65 and the winding reel 48 which are disposed with a complicated relation of their positions within the apparatus in order to compact the same. A guide path of the leader block 9 along which the leader block 9 is guided from the opening 10 in the tape cartridge to the recess 67 in the hub 66 of the winding reel 48 is determined corresponding to the tape running path. It should be noted that the bent portion 46 is provided in the guide groove 26 in order to compact the apparatus.

Since the hub 66 of the winding reel 48 has the same radius as the hub 7a of the single tape reel 7, there occurs no step between the peripheral face of the hub 66 and the rear face 9a of the leader block 9 when the leader block 9 is inserted into the recess 67 in the hub 66 of the winding reel 48. It should be noted that the winding reel has the same radius as the single tape reel 7.

The tape guides 62, 64 and 65 are securely provided on the chassis 1 while the tape guide 61 is disposed on an angularly swingable plate 69 which is in turn pivotally supported by a pivotal pin 68 on the chassis 1. The angularly swingable plate 69 is angularly moved by a predetermined drive mechansim not shown to a position shown by a dotted line of FIG. 8 where the leader block 9 can move without any disturbance by the angularly swingable plate 69 when the magnetic tape 8 is drawn out of the tape cartridge 5 or when the magnetic tape 8 is returned into the tape cartridge 5. A leader block guide 70 is formed on the angularly swingable plate 69 and serves to guide the upper portion of the leader block 9 without any engagement with the magnetic tape 8 so that the leader block 9 is positively contained into the opening 10 in the tape cartridge 5 when the magnetic tape 8 is to be contained into the tape cartridge 5.

On the upper face of the tape guides 64 and 65 is formed a leader block guide 72 which serves to guide the upper portion of the leader block 9 without any engagement with the tape 8 so that the leader block 9 never engages the tape guides 64 and 65.

In operation, as shown in FIG. 3, in case that the holder base plate 4 is upwardly and angularly moved by the coil springs 18 and 18 to the cartridge loading and unloading position, the slidable plate 41 is held at the position to which it is moved by the locking plates 36 and 36 and the locking pins 40 and 40 in a leftward direction while the control arm 37 is held at the position where it is angularly moved in a counterclockwise direction. Thus, it will be noted from FIG. 3 that the control arm 37 engages the flange 33 of the engagement member 30 for the drawing pin means 25 as shown in FIG. 5b so that the engagement member 30 is downwardly forced against the coil spring 32.

In this condition, the tape cartridge 5 at its front face 5a is inserted into the cartridge holder 6 without any disturbance by the drawing pin means 25. After the tape cartridge 5 is loaded in the cartridge holder 6, the portion of the tape cartridge 5 which protrudes from the front panel 110 is pushed down and as a result the holder base plate 4 is downwardly forced against the coil springs 18 and 18 as shown in FIG. 5a.

At that time, since the locking pins 40 and 40 are positioned at the notches 71 and 71 in the locking arms 36 and 36, the slidable plate 41 is moved in a rightward direction by the springs 44 and 44 as shown in FIG. 2 while the locking arms 36 and 36 and the control arm 37 are angularly moved in a clockwise direction. Thus, it will be noted from FIG. 2 that the tape cartridge 5 is brought to the cartridge operative position. In this condition, the holder base plate 4 is locked by the locking arms 36 and 36 while the drawing pin means 25 is brought to the position where it is engaged with the leader block 9 as shown in FIG. 5a because the flange 33 of the engagement member 30 for the drawing pin means 25 is disengaged from the control arm 37.

Figure 9:
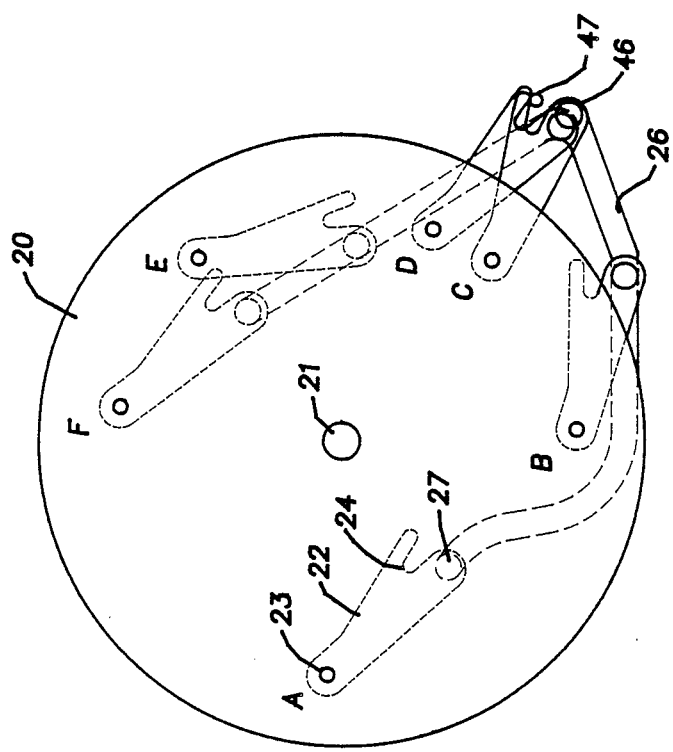
FIG. 9 sequentially illustrates the positions of arms for guiding the drawing pin member.

FIG. 9 sequentially illustrates the movement of the arm 22 which is associated with the drawing pin means 25 for moving the leader block 9 along the guide path by the drawing pin means 25.

As the condition on which the tape cartridge 5 is brought to the cartridge operative position is detected, the electric motor 102 rotates in one direction to rotate the spur wheel 20 in a counterclockwise direction through the worm gear 103, the worm wheel 105 and the reduction gears 106 and 107 for the purpose of inserting the leader block 9 into the recess 67 in the hub 66 of the winding reel 48. At that time, the reel support 92 engaged with the single tape reel 7 in the tape cartridge 5 is rotationally driven by the electric motor 91 so that a back tension is applied to the magnetic tape 8 without its looseness while it is drawn out. Also, the angularly swingable plate 69 is angularly swung to the dotted line of FIG. 8 so as to prevent it from disturbing the movement of the leader block 9.

As the spur wheel 20 rotates, the drawing pin member 27 is guided by the guide groove 26 to move the arm 22 from the position A to the position B of FIG. 9. As the spur wheel 20 continues to rotate in a counterclockwise direction from the position B of the arm 22, the arm 22 is brought to the position C where the engaging recess 24 in the arm 22 engages the control pin 47.

It should be understood that the back tension applied to the magnetic tape 8 causes the arm 22 to be urged to angularly move in a clockwise direction about the axis 23 of the arm 22 during the movement of the arm 22 from the position A to the position C. This causes the drawing pin member 27 to be controlled by the outer wall of the guide groove 26.

As the spur wheel 20 continues to rotate, the arm 22 is brought to the position D where the axis 23 of the arm 22 and the drawing pin member 27 are nearly aligned with each other on a line and the engaging recess 24 in the arm 22 is nearly disengaged from the control pin 47.

Since a locus along which the arm 22 moves is controlled by the engagement recess 24 in the arm 22 and the control pin 47, the drawing pin member 27 angularly moves in a clockwise direction about the axis of the control pin 47 within the bent portion 46 of the guide groove 26. This prevents the drawing pin member 27 from moving back along the guide groove 26. At this position D of the arm 22, the drawing pin member 27 moves far away from the outer wall of the guide groove 26, and as the spur wheel 20 further rotates, the arm 22 is brought to the position E and finally to the position F where the leader block 9 is inserted into the recess 67 in the winding reel 48.

While the magnetic tape 8 is being drawn out, the leader block guide 72 guides the upper portion of the leader block 9 without any engagement of the leader block 9 with the tape guides 64 and 65.

The spur wheel 20 stops corresponding to the position F by a predetermined position detector and the angularly swingable plate 69 is returned to the position indicated by a solid line of FIG. 8 where the magnetic tape 8 is positioned at the tape running path.

In this condition, the winding reel 48 and the single tape reel 7 are rotationally driven by the electric motors 90 and 91, respectively, to record or reproduce information on the magnetic tape 8 or from the magnetic tape 8 through the magnetic head 63.

A method of adjusting the positioning means 49 to position the drawing pin means 25 at the rotational axis of the winding reel 48 at the position F of the arm 22 will be described hereinbelow with reference to FIGS. 7a through 7c. Before it is adjusted, the screws 51, 51 and 51 are loosened to allow the central portion 54 of the positioning plate 53 to move within the circular hole 50 in the holder base plate 4. Thereafter, the positioning plate 53 is moved for adjusting it so as to position the drawing pin member 27 engaging the bottom of the notch 56 in the central portion 54 at the rotational axis of the winding reel 48 and finally the screws 51, 51 and 51 are tightened.

Removal or unloading operation of the tape cartridge 5 will be described hereinbelow. As the cartridge removal button 113 is pushed down to generate a predetermined instruction to rewind the magnetic tape 8 on the single tape reel 7 as shown in FIG. 8. As such a condition is detected, the electric motor 102 is rotationally driven in the other direction to begin to rotate the spur wheel 20 in a clockwise direction through the worm gear 103, the worm wheel 105 and the reduction gears 106 and 107. At that time, the reel support 92 engaging the single tape reel 7 in the tape cartridge 5 is driven by the electric motor 91 so as to rewind the magnetic tape 8 without any looseness and the angularly swingable plate 69 shown in FIG. 8 is swung to the position indicated by the dotted line of FIG. 8 where the leader block 9 is never disturbed from moving.

Accordingly, the leader block 9 is moved from the position F to the position A to be returned to the position where it is inserted into the opening 10 in the tape cartridge 5 and the spur wheel 20 stops.

It should be noted that the leader block guide 72 guides the upper portion of the leader block 9 so that the leader block 9 never engages the tape guides 64 and 65. Also, the leader block guide 70 guides the leader block 9 so that the leader block 9 is positively inserted into the opening 10 in the tape cartridge 5.

Following the condition, the plungers 45 and 45 are electrically excited for the purpose of removing the tape cartridge 5. This electrical excitation of the plungers 45 and 45 causes the slidable plate 41 to move in a leftward direction against the springs 44 and 44 and therefore the locking arms 36 and 36 and the control arm 37 to rotate in a counterclockwise direction as viewed in FIG. 3. This causes the control arm 37 to engage the flange 33 of the engagement member 30 for the drawing pin means 25 and also the locking arms 36 and 36 to be disengaged from the locking pins 40 and 40.

As a result, in the condition that the engagement member 30 for the drawing pin means 25 is held at its position by the control arm 37, the holder base plate 4 rotates about the pivotal pins 3 and 3 by the coil springs 18 and 18 until the holder base plate 4 is controlled by the stops 17 and 17. Thus, the holder base plate 4 is brought to the loading and unloading position as shown in FIG. 3.

It should be noted that the loading and unloading position of the tape cartridge 5 is held by the engagement of the locking arms 36 and 36 with the locking pins 40 and 40 although the plungers 45 and 45 are interrupted from being electrically excited.

Figure 10:
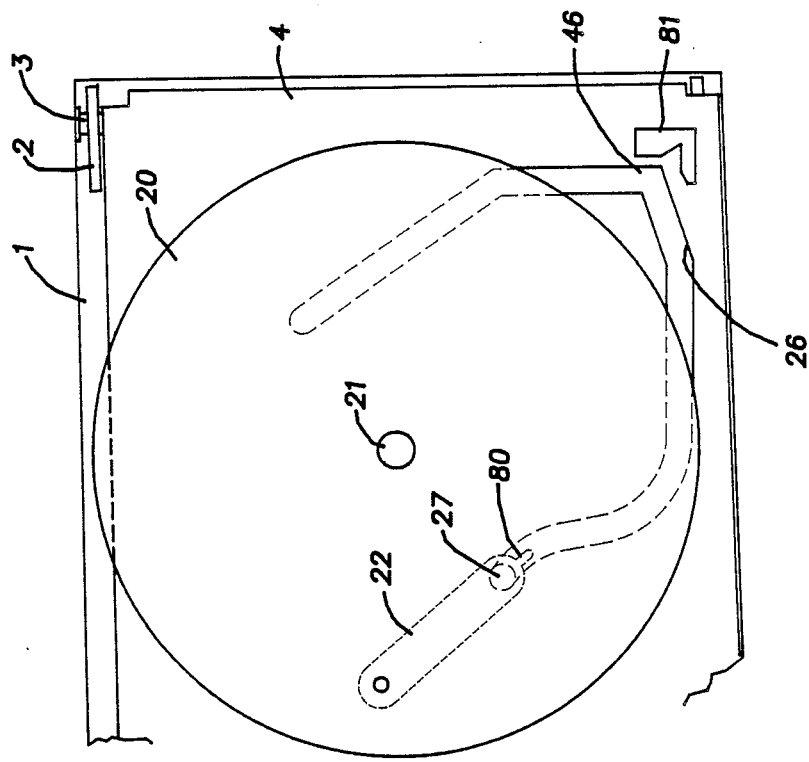
FIG. 10 illustrates in plane view a modification of means to prevent the drawing pin member from moving back.

FIG. 10 illustrates a modification of means to prevent the drawing pin means 25 from moving back at the bent portion 46 of the guide groove 26. In this modification, the engagement recess 24 in the arm at its free end in the aforementioned embodiment is replaced by an engagement protrusion 80 provided on the arm 22 at its free end and the control pin 47 of the aforementioned embodiment is replaced by a control block 81 having a recess corresponding to the engagement protrusion 80 on the arm 22. Since the operation of the modified means is substantially identical to that of the aforementioned embodiment, the description of it will be omitted.

Although some embodiments of the invention have been illustrated and described with reference to the accompanying drawings, it will be apparent to those skilled in the art that they are by way of example, and that various changes and modifications may be made without departing from the spirit and scope of the invention. For example, although, in the illustrated embodiment, the leader block guide and drive means comprises the spur wheel and the arm, it may comprise a pair of arms. It should be noted that the invention is to be defined only by the appended claims.

What is claimed is:

1. A magnetic recording and reproducing apparatus having length, width, and height dimensions, said apparatus being adapted for use with a tape cartridge including a single tape reel having a rotational axis extending in the direction of the height dimension of said apparatus and a magnetic tape wound therearound for feed along a running path extending past a magnetic head of said apparatus and to a winding reel provided by said apparatus, said magnetic tape including a leading end received within a leader block, said apparatus also including leader block guide and drive means to guide and drive said leader block and leading end of said magnetic tape from said tape cartridge to said winding reel, said winding reel having a rotational axis extending in the direction of the height dimension of said apparatus and also including a recess to mount said leader block on said winding reel, said leader block guide and drive means comprising at least an electric motor and transmission means for driving a drawing pin member engageable with said leader block, said tape cartridge having a front face and a side face, said tape cartridge being adapted to be inserted front face-first into said apparatus in an operative position with said single tape reel disposed so that the rotational axis of said single tape reel is positioned on one side of a first line which divides a length of said apparatus into two halves and on one side of a second line which divides the width of said apparatus into two halves, said leader block being disposed on the other side of said second line and said tape cartridge being disposed so that said side face thereof extends along the length dimension of said apparatus, said winding reel being disposed so that said rotational axis of said winding reel is positioned on the other side of said first line and on the one side of said second line, said magnetic head being disposed on the other side of said first line and on the other side of said second line, at least said electric motor being disposed on the one side of said first line and on the other side of said second line, and said second line and said rotational axis of said winding reel being spaced a distance greater than that between said second line and said rotational axis of said single tape reel.

2. A magnetic recording and reproducing apparatus as set forth in claim 1, and wherein said winding reel has the same diameter as said single tape reel.

3. A magnetic recording and reproducing apparatus as set forth in claim 1, and wherein said leader block guide and drive means further comprises a spur gear rotationally driven by a reduction drive means and an arm being pivotally supported on said spur gear and having a drawing pin member provided thereon to be engageable with said leader block.

* * * * *